United States Patent
Yanagawa et al.

[11] Patent Number: 5,333,232
[45] Date of Patent: Jul. 26, 1994

[54] OPTICAL FIBER FOR CONNECTION TO WAVEGUIDE TYPE OPTICAL DEVICE AND METHOD OF MANUFACTURING THE SAME

[75] Inventors: Hisaharu Yanagawa; Takahiro Ono, both of Tokyo, Japan

[73] Assignee: The Furukawa Electric Co., Ltd., Tokyo, Japan

[21] Appl. No.: 33,095

[22] Filed: Mar. 16, 1993

[30] Foreign Application Priority Data

Mar. 16, 1992 [JP] Japan .................. 4-89252

[51] Int. Cl.$^5$ ................................. G02B 6/22
[52] U.S. Cl. ..................... 385/127; 385/126
[58] Field of Search ............ 385/123, 125, 126, 127, 385/128; 65/3.11, 3.12, 3.13

[56] References Cited

U.S. PATENT DOCUMENTS

| | | | |
|---|---|---|---|
| 4,179,189 | 12/1979 | Kaminow et al. | 385/128 |
| 4,415,230 | 11/1983 | Keck | 385/127 |
| 4,932,740 | 6/1990 | Berkey et al. | 385/126 X |
| 5,180,410 | 1/1993 | Berkey | 65/3.11 |

FOREIGN PATENT DOCUMENTS

| | | | |
|---|---|---|---|
| 0021712 | 1/1981 | European Pat. Off. | |
| 56-24306 | 3/1981 | Japan . | |
| 56-27104 | 3/1981 | Japan | 385/126 |
| 56-92505 | 7/1981 | Japan | 385/127 |
| 58-85403 | 5/1983 | Japan | 385/127 |
| 59-15905 | 1/1984 | Japan . | |
| 60-90306 | 5/1985 | Japan . | |
| 63-225542 | 9/1988 | Japan | 385/127 |
| 32-18938 | 9/1991 | Japan . | |
| 4-39605 | 2/1992 | Japan | 385/127 |
| 2221903A | 2/1990 | United Kingdom . | |

OTHER PUBLICATIONS

H. Yanagawa et al., *Mode-Field Converting Fiber for Coupling to Photonic Devices*, OFC/IOOC'93 Technical Digest, Paper No. TuB1, 2 pages, 1993 (month not available).

*Primary Examiner*—John D. Lee
*Attorney, Agent, or Firm*—John P. White

[57] ABSTRACT

An optical fiber for connection to waveguide type optical device has a core having a flat cross-section, a first clad which is formed along a greater diameter of the core and which has a refractive index smaller than that of the core, and a second clad which is formed outside of the core and the first clad and which has a refractive index smaller than that of the core and greater than that of the first clad, wherein $a2 \cdot \Delta 2 = b^2 \cdot \Delta 1$, where a is the greater diameter of the core, b is the smaller diameter of the core, $\Delta 1$ is the difference in specific refractive index between the core and the first clad, and $\Delta 2$ is the difference in specific refractive index between the core and the second clad.

5 Claims, 2 Drawing Sheets

OPTICAL FIBER FOR CONNECTION TO WAVEGUIDE TYPE OPTICAL DEVICE AND METHOD OF MANUFACTURING THE SAME

Background of the Invention

1. Field of the Invention

This invention relates to an optical fiber used for connection to a waveguide type optical device such as a waveguide type optical switch.

2. Description of the Related Art

A conventional optical fiber for connection to a waveguide type optical device such as an optical switch, as shown in FIG. 1, has a structure in which clad 12 is formed on the outer periphery of core 11 having an ellipsoidal cross-section. A reason for making the cross-section of the core ellipsoidal is that a waveguide of the waveguide type optical device to be connected to an optical fiber has a rectangular cross-section, its modefield is in the shape of a flat ellipsoid, and the modefield of the optical fiber is made to correspond to that of the waveguide as much as possible. An optical fiber in this type requires the following characteristics.

The first characteristic is that the ellipsoidal degree (greater diameter/smaller diameter) of the mode-field of the optical field is so adequately great as to correspond to that of the modefield of the waveguide type optical device.

The second characteristic is that when bending stress is added to the optical fiber, loss can be reduced and light in the wide frequency range can be transmitted.

However, a convention optical fiber for connection to the waveguide type optical device does not satisfy these requirements.

As regards the first characteristic, a problem may relate to the core diameter and the size of the modefield. FIG. 2 is a graph indicating the relationship between the core diameter and the size of the modefield when the core diameter is varied with a constant difference Δ in specific refractive index between the core and the clad. As understood from this figure, when the core diameter is too small, the entrapment effect of light, i.e. effect of transmitting light transmitted from an optical fiber to a waveguide as it remains becomes small, and the light exudation from the core, i.e. light leak becomes great. Thus, the modefield becomes great. On the other hand, when the core diameter is made great, the light exudation becomes small since the light entrapment becomes great. However, the modefield becomes great in accordance with the core diameter. Therefore, as indicated in FIG. 2, the modefield size has a minimum value. Then, the core diameter is chosen in the region including a value greater than the minimum value of size c of the modefield.

When the cross section of the core is ellipsoidal with its greater diameter indicated by a and its smaller diameter indicated by b in the graph of FIG. 2, the greater diameter direction is indicated by e and the smaller diameter is indicated by f in the size of the modefield. As regards the optical fiber having an ellipsoidal cross-section, if the ellipsoidal degree (a/b) of the core is made great, the degree (e/f) of the modefield is not made so, by setting the greater diameter a and the smaller diameter b greater than the core diameter c when the modefield is at minimum. There will be a reason that the light exudation from the core is great in the smaller diameter direction although the core diameter is small and the light entrapment to the core is great in the greater diameter direction although the core diameter is great.

Accordingly, although the ellipsoidal degree of the core is made great in the conventional optical fiber for connection to the waveguide type optical device, the ellipsoidal degree of the modefield does not become so great. Therefore, It is impossible to make the ellipsoidal degree of the modefield of the optical fiber for connection to the waveguide type optical device correspond to that of the modefield of the waveguide type optical device.

As regards the second characteristic, a problem may relate to satisfaction of a single mode condition. If the single mode condition is satisfied in the greater diameter direction, at the optical fiber having the core with an ellipsoidal cross-section, the greater diameter a is limited. When the smaller diameter b is chosen from a required ellipsoidal degree with reference to the limited greater diameter a, the light entrapment is nothing but small in the smaller diameter direction (i.e. peripheral surface of the greater diameter direction). If the light entrapment is small, the loss can be easily generated when the bending stress is forced to the optical fiber, and in particular, the loss may increase beyond its capacity limit in the case of light in the long frequency range.

SUMMARY OF THE INVENTION

It is an object of this invention to provide an optical fiber for connection to the waveguide type optical device which allows to obtain an optical fiber wherein the ellipsoidal degree of the modefield is greater than a conventional one, loss when the bending stress is added is small, and the properties of connection to the waveguide type optical device is improved.

This object is achieved by an optical fiber for connection to waveguide tope optical device has a core having a flat cross-section; a first clad which is formed along a greater diameter of the core and which has a refractive index smaller than that of the core; and a second clad which is formed outside of the core and the first clad and which has a refractive index smaller than that of the core and greater than that of the first clad; wherein generally, $a^2 \cdot \Delta 2 = b^2 \cdot \Delta 1$, where a is the greater diameter of the core, b is the smaller diameter of the core, $\Delta 1$ is the difference in specific refractive index between the core and the first clad, and $\Delta 2$ is the difference in specific refractive index between the core and the second clad.

It is another object of this invention to provide a method of manufacturing an optical fiber for connection to waveguide type optical device which allows to obtain the optical fiber with good efficiency.

This object is achieved by a method of manufacturing an optical fiber for connection to waveguide type optical device, having the steps of: forming a first clad on the outer periphery of a core; grinding the first clad to obtain a glass rod having a pair of plan surfaces; subjecting the glass rod to a heat treatment to make the cross-section of the glass rod circular; producing the cylindrical second clad having a hollow portion into which the glass rod processed in the heat treatment is inserted; inserting the glass rod processed in the heat treatment into the hollow portion of the second clad and subjecting the glass rod to a collapse treatment, thereby producing an optical fiber preform; and drawing the preform to obtain optical fiber.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of this invention will be explained in detail with reference to figures.

Figure 1:
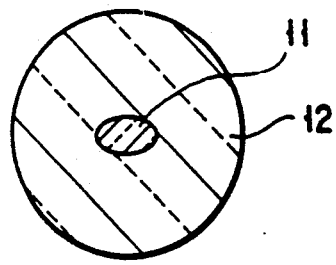
FIG. 1 is a cross-sectional view showing a conventional optical fiber to be connected to a waveguide type optical device.
Figure 2:
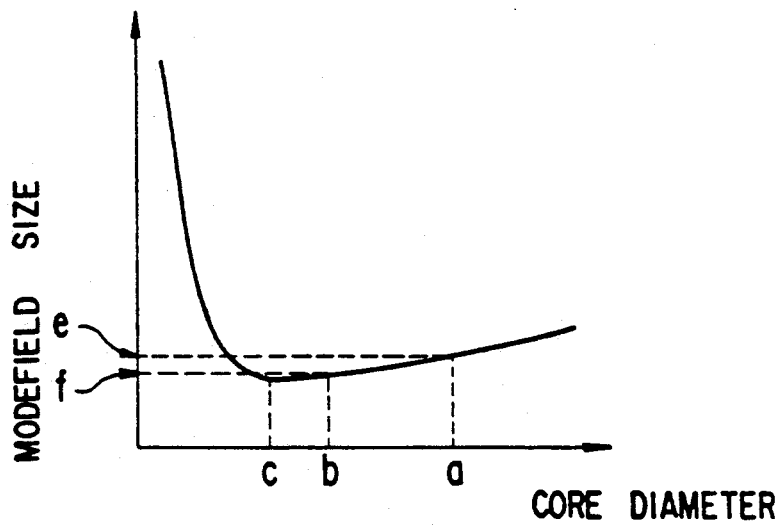
FIG. 2 is a graph indicating the relationship between the core diameter and the modefield size.
Figure 3:
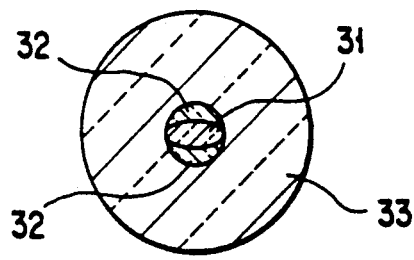
FIG. 3 is a cross-sectional view showing one embodiment of the optical fiber for connection to the waveguide type optical device according to this invention.

FIG. 3 is a cross-sectional view showing one embodiment of the optical fiber to be connected to the waveguide type optical device. In this figure, numeral 31 indicates a core having an ellipsoidal cross-section. As the material of the core, silica containing Ge as a dopant can be used. First clad 32 is formed along the greater diameter direction of the core 31. The first clad 32 has a smaller refractive index than that of the core 31. As the material of the first clad 32, silica containing B or F as a dopant can be used. The cross-section of the first clad 32 having the core 31 is in a circular shape. Second clad 33 is formed at the outer periphery of the first clad 32 having the core 31. The second clad 33 has a refractive index which is smaller than that of the core 31 and greater than that of the first clad 32. As the material of the second clad 33, silica can be used.

When the greater diameter of the core 31 is indicated by a, the smaller diameter thereof is indicated by b, the difference in specific refractive index between the core 31 and the first clad 32 is indicated by $\Delta 1$, and the difference in specific refractive index between the core 31 and the second clad 33 is indicated by $\Delta 2$, the relationship between the core diameter and the refractive index is set to be at generally $a^2 \cdot \Delta 2 = b^2 \cdot \Delta 1$. By setting the core diameter and the refractive index in this manner, it is possible to make the ellipsoidal degree of the modefield equivalent to that of the core and therefore obtain a modefield having an ellipsoidal degree (flatness) greater than that of a conventional one. In order to satisfy $a^2 \cdot \Delta 2 = b^2 \cdot \Delta 1$, the shape of the core 31 the content of the dopant contained in the core 31, the first clad, and the second clad are controlled.

Figure 4A:
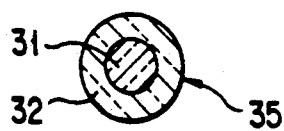
FIGS. 4A to 4E are cross-section views showing steps of manufacturing the optical fiber for connection to the waveguide type optical device according to this invention.
Figure 4B:
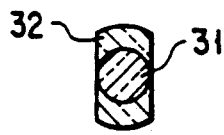
Figure 4C:
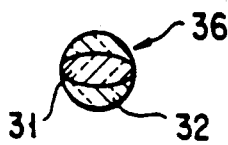

The optical fiber for connection to the waveguide type optical device can be manufactured in the manners shown in FIGS. 4A to 4E. First, as shown in FIG. 4A, the first clad 32 is formed on the outer periphery of the core 31 having a circular cross-section and glass rod 35 having a circular cross-section is produced. Next, as shown in FIG. 4B, the glass rod 35 is ground so as to expose the core 31 of the glass rod 35. The ground glass rod 35 has a pair of plan surfaces which are opposite to each other. The cross-section of the glass rod 35 is shaped by the enclosure with a pair of lines facing each other and two arcs. The core 31 is not ground. When the glass rod 35 is heated and fused, for example, at 1,500° C., the shape of the cross-section is made circular by the surface tension, as shown in FIG. 4C. At this time, the core 31 has an ellipsoidal cross-section. As a method of forming the first clad, a porous body of silica powder is formed on the outer periphery of the core by CVD, etc. and the obtained is purified and sintered. In this way, glass rod 36 is produced.

Figure 4D:
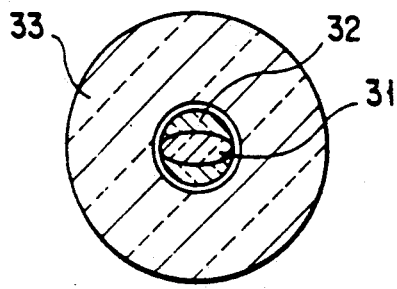
Figure 4E:
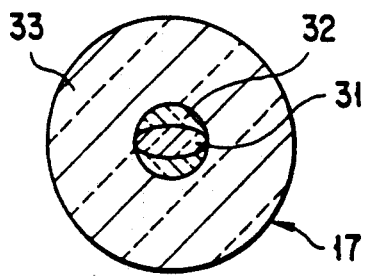

Next, cylindrical second clad 33 having a hollow portion into which the glass rod 36 can be inserted is produced. Then, as shown in FIG. 4D, the glass rod 36 is inserted into the hollow portion of the second clad 33. The clad is subjected to a collapse treatment, and as shown in FIG. 4E, an optical fiber preform 37 is produced. Further, the preform 37 is drawn in a general drawing manner, and an optical fiber for connection to the waveguide type optical device having a cross-section as shown in FIG. 3 can be obtained.

As regards this optical fiber for connection to the waveguide type optical device, the light entrapment is assured by varying the difference $\Delta$ in specific refractive index between the core and the clad in both of the greater diameter direction and the smaller diameter direction. To explain in detail, the value $\Delta$ is made great in the smaller diameter direction of the small light entrapment (i.e. at a portion along the greater diameter direction of the core), in order to increase the effect of the light entrapment. Thus, it is possible to make the ellipsoidal degree of the modefield equivalent to that of the core.

Figure 5:
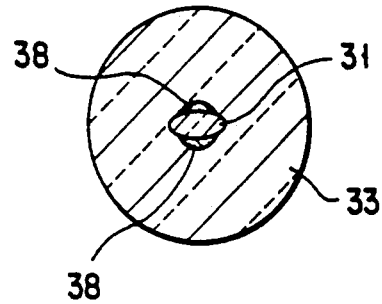
FIGS. 5 to 7 are cross-sectional views showing a other embodiment of the optical fiber for connection to the waveguide type optical device according to this invention.
Figure 6:
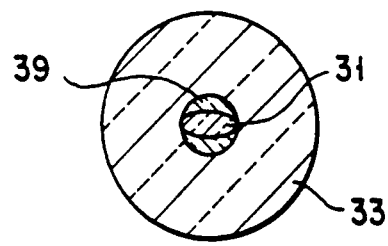
Figure 7:
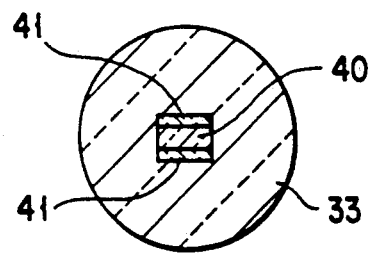

FIGS. 5 to 7 are cross-sectional views showing a other embodiment of the optical fiber for connection to the waveguide type optical device according to this invention. FIG. 5 shows an optical fiber wherein a first clad 38 has a small cross-sectional area for covering the core 31, i.e. wherein the ellipsoidal core 31 is projected in the greater diameter direction of the cross-section. FIG. 6 shows an optical fiber including a first clad 39 which covers the overall core 31. In this case, the first clad 39 formed at the portion along the greater diameter of the core 31 is required to be thin so as not to substantially function as a clad. Further, FIG. 7 shows an optical fiber wherein first clad 41 is formed on the peripheral surface of core 40 with a rectangular cross-section, in the greater diameter (longer edge) direction. In the FIGS. 5 to 7, the manufacturing method and the relationship between the core and the refractive index are the same as those described in FIG. 3.

When the light wavelength is indicated by $\lambda$, the core refractive index is indicated by n, and the value of $2\pi n \cdot \{ab \cdot 2(\Delta 1 \cdot \Delta 2)^{0.5}\}^{0.5}/\lambda$ is set to be in the range from 1.8 to 2.6, it is preferable that loss caused by the bending stress is sufficiently reduced in a long optical fiber, since the light entrap is sufficient. This obtained value almost corresponds to the characteristic that the barrier wavelength is in the range of 1.1 to 1.3 μm while the used wavelength is in range of 1.3 to 1.55 μm, as regards a single mode optical fiber whose general cross-section is round.

Example

As the material of the core, silica glass doped with $GeO_2$ at 25 molar percent was used; as the material of the first clad, silica glass doped with fluorine at 2.5 atomic percent was used; and as the material of the second clad, pure silica glass was used.

The core diameters and the differences in specific refractive index were set as follows.

GREATER DIAMETER OF CORE a : 9 μm.
SMALLER DIAMETER OF CORE b : 4.5 μm.
DIAMETER OF FIRST CLAD : 9 μm.
DIAMETER OF SECOND CLAD : 125 μm.
DIFFERENCE IN SPECIFIC REFRACTIVE INDEX BETWEEN CORE AND FIRST CLAD Δ1: −1%.
DIFFERENCE IN SPECIFIC REFRACTIVE INDEX BETWEEN CORE AND SECOND CLAD Δ2 : −0.25%.

Therefore, $a^2 \cdot \Delta 2 = b^2 \cdot \Delta 1$ was satisfied.

As regards the optical fiber for connection to the waveguide type optical device as manufactured in this manner, the ellipsoidal degree of the modefield could be made equivalent to that of the core, and therefore the optical fiber could be preferably connected to the waveguide type optical device.

According to this invention as explained above, it is possible to obtain the optical fiber wherein the ellipsoidal degree is greater than that of a conventional one and loss when the bending stress is added is decreased. The optical fiber has an extremely special advantage for increasing properties of connection to the waveguide type optical device.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical fiber for connection to waveguide type optical device, comprising:
    a core having a flat cross-section;
    a first clad formed along a greater diameter of the core, and having a refractive index smaller than that of the core; and
    a second clad formed outside of the core and the first clad, and having a refractive index smaller than that of the core and greater than that of the first clad;
    wherein generally $a^2 \cdot \Delta 2$, $b^2 \cdot \Delta 1$, where a is the greater diameter of the core, b is the smaller diameter of the core, Δ1 is the difference in specific refractive index between the core and the first clad, and Δ2 is the difference in specific refractive index between the core and the second clad.

2. The optical fiber according to claim 1, wherein the core projects from the first clad in the greater diameter direction in the cross-section.

3. The optical fiber according to claim 1, wherein the first clad is formed so as to cover the overall core and the first clad formed on an area along the greater diameter of the core is thin so as not to substantially function as a clad.

4. The optical fiber according to claim 1, wherein the core has a rectangular cross-section.

5. The optical fiber according to claim 1, wherein when the wavelength of light to be transmitted is indicated by λ and the refractive index of the core is indicated by n, the value of $2\pi n \cdot \{ab \cdot 2(\Delta 1 \cdot \Delta 2)^{0.5}\}^{0.5}/\lambda$ is in the range of 1.8 to 2.6.

* * * * *